US011938506B2

(12) United States Patent
Lavelanet et al.

(10) Patent No.: US 11,938,506 B2
(45) Date of Patent: Mar. 26, 2024

(54) PISTON, CARTRIDGE, DISPENSER

(71) Applicant: Sulzer Mixpac AG, Haag (CH)

(72) Inventors: Richard Lavelanet, Balgach (CH); Hayden Turner, Ayer, MA (US)

(73) Assignee: MEDMIX SWITZERLAND AG, Haag (CH)

( * ) Notice: Subject to any disclaimer, the term of this patent is extended or adjusted under 35 U.S.C. 154(b) by 347 days.

(21) Appl. No.: 17/442,714

(22) PCT Filed: Feb. 10, 2020

(86) PCT No.: PCT/EP2020/053229
§ 371 (c)(1),
(2) Date: Sep. 24, 2021

(87) PCT Pub. No.: WO2020/192995
PCT Pub. Date: Oct. 1, 2020

(65) Prior Publication Data

US 2022/0184654 A1 Jun. 16, 2022

(30) Foreign Application Priority Data

Mar. 26, 2019 (EP) .................................... 19165177

(51) Int. Cl.
*B05C 17/005* (2006.01)

(52) U.S. Cl.
CPC .. *B05C 17/00576* (2013.01); *B05C 17/00583* (2013.01)

(58) Field of Classification Search
None
See application file for complete search history.

(56) References Cited

U.S. PATENT DOCUMENTS

| | | | | |
|---|---|---|---|---|
| 1,014,353 | A | 1/1912 | Wiggin | |
| 4,840,293 | A * | 6/1989 | Segatz | B05C 17/015 222/326 |
| 4,854,485 | A * | 8/1989 | Collins | B05C 17/00579 222/386 |
| 4,986,444 | A | 1/1991 | Corso | |
| 5,301,835 | A | 4/1994 | Fulks et al. | |
| 5,443,181 | A | 8/1995 | Popp et al. | |
| 5,567,073 | A | 10/1996 | de Laforcade et al. | |

(Continued)

FOREIGN PATENT DOCUMENTS

| | | |
|---|---|---|
| DE | 92 10 832 U1 | 12/1993 |
| DE | 42 31 420 A1 | 3/1994 |

(Continued)

OTHER PUBLICATIONS

International Search Report dated Apr. 30, 2020 in corresponding International Patent Application No. PCT/EP2020/053229, filed Feb. 10, 2020.

*Primary Examiner* — Paul R Durand
*Assistant Examiner* — Michael J. Melaragno
(74) *Attorney, Agent, or Firm* — GLOBAL IP COUNSELORS, LLP

(57) ABSTRACT

A piston for a support sleeve of a dispensing assembly, the piston has a substantially cylindrical outer shape and includes a piston body as well as first and second film bag retainers arranged at opposite sides of the piston body.

18 Claims, 5 Drawing Sheets

(56) References Cited

U.S. PATENT DOCUMENTS

| | | | | | |
|---|---|---|---|---|---|
| 5,593,066 | A * | 1/1997 | Konuma | B65D 83/0072 | 222/326 |
| 6,632,493 | B1 | 10/2003 | Richard et al. | | |
| 6,976,608 | B2 * | 12/2005 | Ichikawa | B65D 83/0072 | 222/105 |
| 6,984,063 | B2 | 1/2006 | Barker et al. | | |
| 7,690,530 | B2 * | 4/2010 | Schneider | B05C 17/00583 | 222/105 |
| 8,087,550 | B2 * | 1/2012 | Schneider | G01F 11/026 | 222/386 |
| 8,342,371 | B2 * | 1/2013 | Helmenstein | B05C 17/00576 | 222/386 |
| 8,496,140 | B2 * | 7/2013 | Rothen | B05C 11/1042 | 222/386 |
| 8,950,627 | B2 * | 2/2015 | Herman | B65D 83/0033 | 222/326 |
| 9,238,544 | B2 * | 1/2016 | Schulz | B65D 83/0033 | |
| 9,242,784 | B2 * | 1/2016 | Buck | B05C 17/00553 | |
| 9,469,061 | B2 | 10/2016 | Frey | | |
| 9,555,928 | B2 * | 1/2017 | Ettlin | B65D 25/20 | |
| 9,579,686 | B2 * | 2/2017 | Springhorn | B05C 17/00583 | |
| 10,434,528 | B1 * | 10/2019 | Seiler | B05B 11/0081 | |
| 10,773,433 | B2 * | 9/2020 | Bodenmüller | B65D 83/0072 | |
| 10,968,031 | B2 * | 4/2021 | Turner | B05C 17/015 | |
| 11,541,416 | B2 * | 1/2023 | Lavelanet | B05C 17/00579 | |
| 11,712,711 | B2 * | 8/2023 | Kuchinski | B05C 17/00576 | 222/327 |
| 2008/0083789 | A1 | 4/2008 | Brugner | | |
| 2013/0211344 | A1 | 8/2013 | Rodriguez et al. | | |
| 2015/0102132 | A1 * | 4/2015 | Muller | B01F 23/47 | 239/335 |
| 2015/0108251 | A1 * | 4/2015 | Muller | B05B 7/2497 | 239/304 |
| 2015/0114986 | A1 * | 4/2015 | Ngu | B05C 17/00583 | 222/137 |
| 2015/0136812 | A1 * | 5/2015 | Krallmann | B65D 83/0005 | 222/391 |
| 2017/0216874 | A1 * | 8/2017 | Turner | B05C 17/00583 | |
| 2017/0259296 | A1 * | 9/2017 | Obrist | B05C 17/00553 | |
| 2019/0193919 | A1 * | 6/2019 | Turner | B65D 83/0005 | |
| 2019/0241351 | A1 * | 8/2019 | Bodenmüller | B29C 45/36 | |
| 2019/0322018 | A1 * | 10/2019 | Bodenmüller | B65D 83/0055 | |
| 2020/0101488 | A1 * | 4/2020 | Bodenmüller | B05C 17/00583 | |
| 2020/0102122 | A1 * | 4/2020 | Seiler | B65D 35/242 | |
| 2021/0387226 | A1 * | 12/2021 | Lavelanet | B05C 17/00583 | |
| 2021/0394996 | A1 * | 12/2021 | Lavelanet | B65D 83/0072 | |
| 2022/0184654 | A1 * | 6/2022 | Lavelanet | B05C 17/00583 | |
| 2022/0315311 | A1 * | 10/2022 | Bodenmüller | B05C 17/00513 | |
| 2022/0339590 | A1 * | 10/2022 | Turner | B05C 17/0103 | |
| 2022/0411169 | A1 * | 12/2022 | Turner | B05C 17/00583 | |

FOREIGN PATENT DOCUMENTS

| | | | | |
|---|---|---|---|---|
| EP | 2 116 484 | A1 | 11/2009 | |
| EP | 2 998 030 | A1 | 3/2016 | |
| EP | 3 171 813 | A1 | 5/2017 | |
| JP | 2002225488 | A | 8/2002 | |
| WO | 02/051557 | A1 | 7/2002 | |
| WO | 2011/080543 | A1 | 7/2011 | |
| WO | 2016/014764 | A1 | 1/2016 | |
| WO | WO-2020069790 | A1 * | 4/2020 | B05C 17/00576 |

* cited by examiner

PISTON, CARTRIDGE, DISPENSER

CROSS-REFERENCE TO RELATED APPLICATIONS

This application is a U.S. National Stage application of International Application No. PCT/EP2020/053229, filed Feb. 10, 2020, which claims priority to European Patent Application No. 19165177.7, filed Mar. 26, 2019, the contents of each of which are hereby incorporated herein by reference.

BACKGROUND

Field of the Invention

The present invention relates to a piston for a support sleeve of a cartridge, in particular some embodiments are directed to a cartridge formed from a film bag, the piston having an at least substantially cylindrical outer shape and comprising a piston body as well as first and second film bag retainers arranged at opposite sides of the piston body. The invention further relates to a cartridge comprising such a piston and to a dispenser configured to cooperate with such a piston.

Background Information

Conventional reusable cartridge pistons are well known in the art and are configured to be moveable along a discharge axis of a reusable cartridge from a storage position into a discharge position, thereby discharging a material stored in a film bag cartridge housed in a sleeve of the reusable cartridge. The sleeve not only supports the film bag but also guides the piston during its movement from the storage position into the discharge position.

For the later purpose, at least an outer side wall of the generally cylindrical shaped piston contacts an inner wall of the sleeve, thereby stabilizing the piston during its movement along the discharge axis of the reusable cartridge. After the material has been discharged from the film bag, the film bag can be removed from the reusable cartridge and can be replaced by a full new film bag. The reusable cartridge is then ready to be used again. As the reusable cartridge can be used time and again and as only the film bag needs to be replaced, waste can be minimized, as the empty film bag cartridge has a significantly reduced rigidity in comparison to rigid plastic cartridges.

The film bag is typically connected to a head part comprising an outlet from the film bag, this head part is typically also replaced when a film bag cartridge is replaced.

SUMMARY

It has been determined that when replacing the head part and the film bag cartridge, the head part can be improperly placed onto the sleeve at the wrong end of the sleeve in such a way that the piston installed in the sleeve cannot engage the film bag in the intended manner.

For this reason it is an object of embodiments of the invention to provide a cartridge and a dispensing assembly in which the faulty placement of the film bag cartridge at the sleeve can be avoided in order to form a cartridge that is simplified in its handling. It is a further object of the invention to provide at least some components of the dispensing assembly that can then be manufactured in a simpler and more reliable manner in comparison to the conventional components of a dispensing assembly.

This object is satisfied by a piston for a cartridge having the features described herein.

Such a piston for a support sleeve of a dispensing assembly, in particular comprising one or more film bag cartridges, has an at least substantially cylindrical outer shape and comprises a piston body as well as first and second film bag retainers arranged at opposite sides of the piston body, with the reliability and accuracy as previously only possible at one side of the sleeve.

By forming the piston such that it has two sides which can engage a film bag cartridge means that a faulty placement of the film bag cartridge at the sleeve can be avoided, since both the sleeve and the piston are formed symmetrical in the sense that the head part of a cartridge can be placed at either end of the sleeve and the dispensing assembly can still be used.

In this way a re-usable piston is formed in which both sides of the cylinder can be used to cooperate with a film bag cartridge in a reliable manner.

The piston can be configured for use with a film bag cartridge and each of the first and second film bag retainers can be configured to interact, in particular directly, with the film bag cartridge. In this way the piston is configured to collect loose material of the wall of the film bag cartridge when being emptied, as the piston is moved towards the head part on emptying the film bag cartridge. On collecting the loose material of the walls, this material is retained at the film bag retainers and is gradually folded together in a manner similar to that of a concertina.

The piston body can have a disc shaped part and first and second projections projecting from the piston body at opposite sides of the body in the direction of the film bag retainers. This is a simple and sturdy design option for the piston body that provides the piston with the desired stability and that is simple to manufacture.

The first and second projections can be ring-shaped projections. Such projections are simple to manufacture and enable a simple cost effective assembly of the piston body.

The disc shaped part can comprise ribs at its outer circumferential surface. Such ribs can be used to guide the piston body in a piston sleeve when it is received therein.

Each of the film bag retainers can comprise a central projection projecting towards the piston body. Such a central projection can be formed in a cost effective manner in a manufacturing process, e.g. an injection molding process, and can aid in the assembly of the piston.

The central projection can cooperate with a respective one of the first and second projections, preferably wherein the central projection can cooperate with a central aperture of the ring shaped projection. With such a design, it is simple to realize, cost effective to manufacture and ensures a reliable and reproducible assembly of the piston.

Each film bag retainer can be received via one of a press-fit, a friction fit or a snap fit connection at the piston body. These are particularly beneficial ways of assembling the piston if this is a multi-component piston. In this connection it should be noted that the piston can also be made integrally as a single part, e.g. in an injection molding process or a 3D printing process.

The first and second film bag retainers can be formed from materials more flexible than a material of the piston body; and/or wherein the first and second film bag retainers can comprise components more flexible than parts of the piston body.

Each film bag retainer can have a central part surrounded by a ring recess and a collar facing the central part. The collar, the ring recess and the central part can be configured to ensure that a material of the film bag cartridge is reliably collected by the film bag containers on dispensing material from the film bag cartridge and on emptying this.

At least the collar and the ring recess can comprise three or more slots that extend from a radial outer side of the collar towards the central part of the film bag retainer. The provision of slots means that the collar can be formed more flexible than other parts of the piston enabling the collar to move relative to other parts of the piston. This movement can be beneficial on collecting and retaining material from walls forming the film bag cartridge.

A base of the recess can be spaced apart from the piston body by a gap, optionally wherein the gap can have a height selected in the range of 0.7 to 2 mm. The provision of a gap between the collar and the piston body ensures a relative movement can take place between the collar and the piston body. This relative movement can be required in order to collect a material of the film bag cartridge.

A surface of the collar facing the central part can comprises one or more recesses and/or one or more projections. The formation of recesses and/or projections at a surface of the collar facing the central part forms a reinforcing member at the collar and hence ensures that these do not prematurely snap off during their interaction with the film bag cartridge in the sleeve.

The central part of the film bag retainer can comprise a front face remote from the piston body, with the front face forming a flat plane or an at least substantially flat plane. A front face with a flat plane ensures that as much material as possible can be urged out of the corresponding film bag cartridge which cooperates with the piston, thereby waste can be reduced.

The front face can project by 20% to 75% of a height of the film bag retainer beyond a height of the collar, with the height of the film bag retainer being measured between the front face and a base of the film bag retainer remote from the front face, said base facing the piston body. Forming the film bag retainers in this way yields positive results on the collection of the material forming the walls of the film bag cartridge. The first and second film bag retainers can each have a shape that resembles that of a bowler hat.

According to a further aspect embodiments of the present invention relate to a dispensing assembly comprising one or more film bag cartridges, one or more sleeves accommodating a respective one of the one or more film bag cartridges and one or more pistons in a respective one of the one or more sleeves, optionally with each of the one or more film bag cartridges being filled with a material, especially a mastic material.

The advantages discussed in the foregoing in connection with the piston likewise hold true for the dispensing assembly discussed herein.

The cartridge, in particular the multi-component cartridge, of the dispensing assembly can thus be filled with materials selected from the group of members consisting of topical medications, medical fluids, wound care fluids, cosmetic and/or skin care preparations, dental fluids, veterinary fluids, adhesive fluids, disinfectant fluids, protective fluids, paints and combinations of the foregoing.

Such materials and hence the dispensing assembly can therefore be expediently used in the treatment of target areas such as the nose (e.g. anti-histaminic creams etc.), ears, teeth, i.e. dental applications, (e.g. molds for implants or buccal applications (e.g. aphtas, gum treatment, mouth sores etc.), eyes (e.g. the precise deposition of drugs on eyelids (e.g. chalazion, infection, anti-inflammatory, antibiotics etc.), lips (e.g. herpes), mouth, skin (e.g. anti-fungal, dark spot, acne, warts, psoriasis, skin cancer treatment, tattoo removal drugs, wound healing, scar treatment, stain removal, anti-itch applications etc.), other dermatological applications (e.g. skin nails (for example anti-fungal applications, or strengthening formulas etc.) or cytological applications.

Alternatively the materials and hence the dispensing assembly can also be used in an industrial sector both for the production of products as well as for the repair and maintenance of existing products, e.g. in the building industry, the automotive industry, the aerospace industry, in the energy sector, e.g. for wind turbines, etc. The dispensing assembly can, for example, be used for the dispensing of construction material, sealants, bonding material, adhesives, paints, coatings and/or protective coatings.

According to a further aspect embodiments of the present invention relate to a dispenser comprising one or more push rods each of said one or more push rods being configured to move one or more pistons to and fro along a dispensing axis of the respective push rod, wherein the one or more push rods can be coupled to the one or more pistons or is fixedly connected to the one or more pistons.

In this way a particularly simple to handle dispenser is made available.

BRIEF DESCRIPTION OF DRAWINGS

The invention will be explained in more detail hereinafter with reference to the drawings.

DETAILED DESCRIPTION

Figure 1:
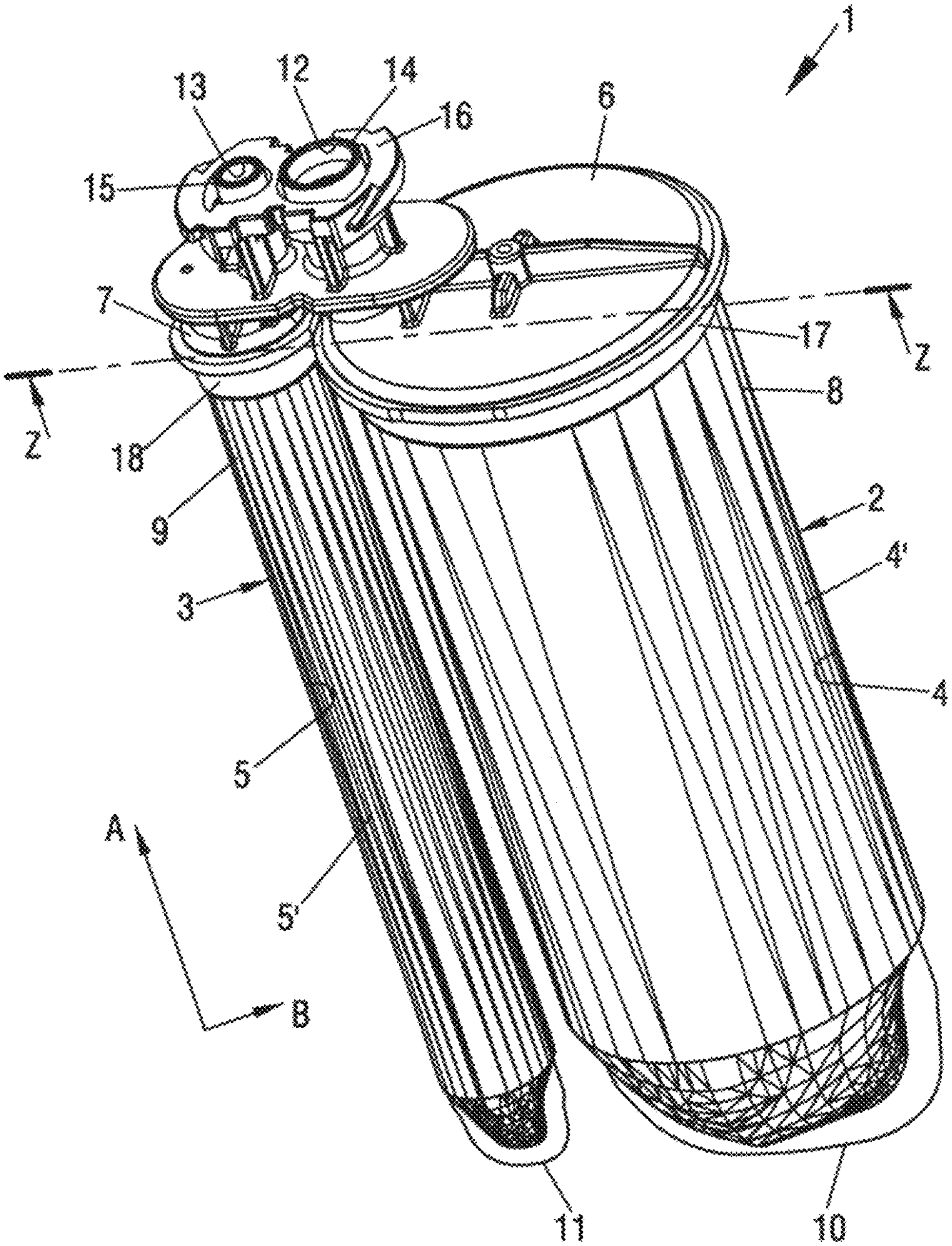
FIG. 1 is a perspective view of a two-component cartridge.

In the following the same reference numerals will be used for parts having the same or equivalent function. Any statements made having regard to the direction of a component are made relative to the position shown in the drawing and can naturally vary in the actual position of the application.

FIG. 1 shows a cartridge 1 configured as a two-component cartridge. The cartridge 1 comprises two generally cylindrical cartridge chambers 2, 3. The cartridge chambers 2, 3 are each bound by a cartridge wall 4, 5 as well as by a head part 6, 7, with each head part 6, 7 being arranged at a respective front end 8, 9 of the cartridge wall 4, 5. Each cartridge wall 4, 5 extends in a longitudinal direction A of the cartridge 1 from a respective rear end 10, 11 to the respective front end 8, 9.

Each head part 6, 7 is a stable shaped part of generally plate-like shape and comprises respective dispensing outlets 12, 13 via which a respective medium (not shown) can be dispensed from the cartridge chambers 2, 3. The two dispensing outlets 12, 13 extend from the head parts 6, 7 as outlet passages 14, 15 through a common outlet part 16. A mixing element 78 (see FIG. 7) or closure part (each not shown) can be connected to the outlet part 16.

Each head part 6, 7 has a collar 17, 18, with each collar 17, 18 surrounding the dispensing outlet 12, 13 in a radially outer region of the head part 6, 7. A radial direction B is indicated relative to the arrow A used to identify the longitudinal direction A. Each collar 17, 18 has a length extending in the longitudinal direction A. The front end 8, 9 of each cartridge wall 4, 5 is sealingly and non-releasably connected to the collar 17, 18 of the head part 6, 7. The front end 8, 9 of each cartridge wall 4, 5 can be connected to an inner or an outer surface of the respective collar 17, 18 in a sealing and non-releasable manner. The cartridge walls 4, 5 are each formed from a film 4', 5'. Each rear end 10, 11 of the cartridge walls 4, 5, formed from the film 4', 5', is welded shut in a sealing manner in the present example to form a respective film bag cartridge 1.

It should further be noted in this connection that the film 4', 5' forming the cartridge walls 4, 5 can be a multilayer film having at least two layers formed from different materials. Such multi-layer films are used e.g. when particularly aggressive substances are stored in the cartridge 1.

It should also be noted that the film 4', 5', regardless of whether it is a film made from one type of material or a multilayered film made from one or more different types of materials, can have a thickness of at most 0.3 mm, more specifically of at most 0.15 mm, preferably of approximately 0.04 to 0.1 mm.

It should also be noted that the cartridge 1 can also be configured as a one-component cartridge, comprising only one generally cylindrical cartridge chamber 2 with a single head part 6 and a film 4' forming the cartridge wall 4. In the following, corresponding features of the one-component cartridge 1 and corresponding features of the two-component cartridge 1 mutually hold true.

It is necessary that the connection between the film 4', 5' defining the cartridge wall 4, 5 to its respective head part 6, 7 is tightly sealed and does not leak such that the medium that is to be dispensed via the dispensing outlet 12, 13 does not exit from the cartridge 1 at any other position other than via the outlet part 16.

Figure 2:
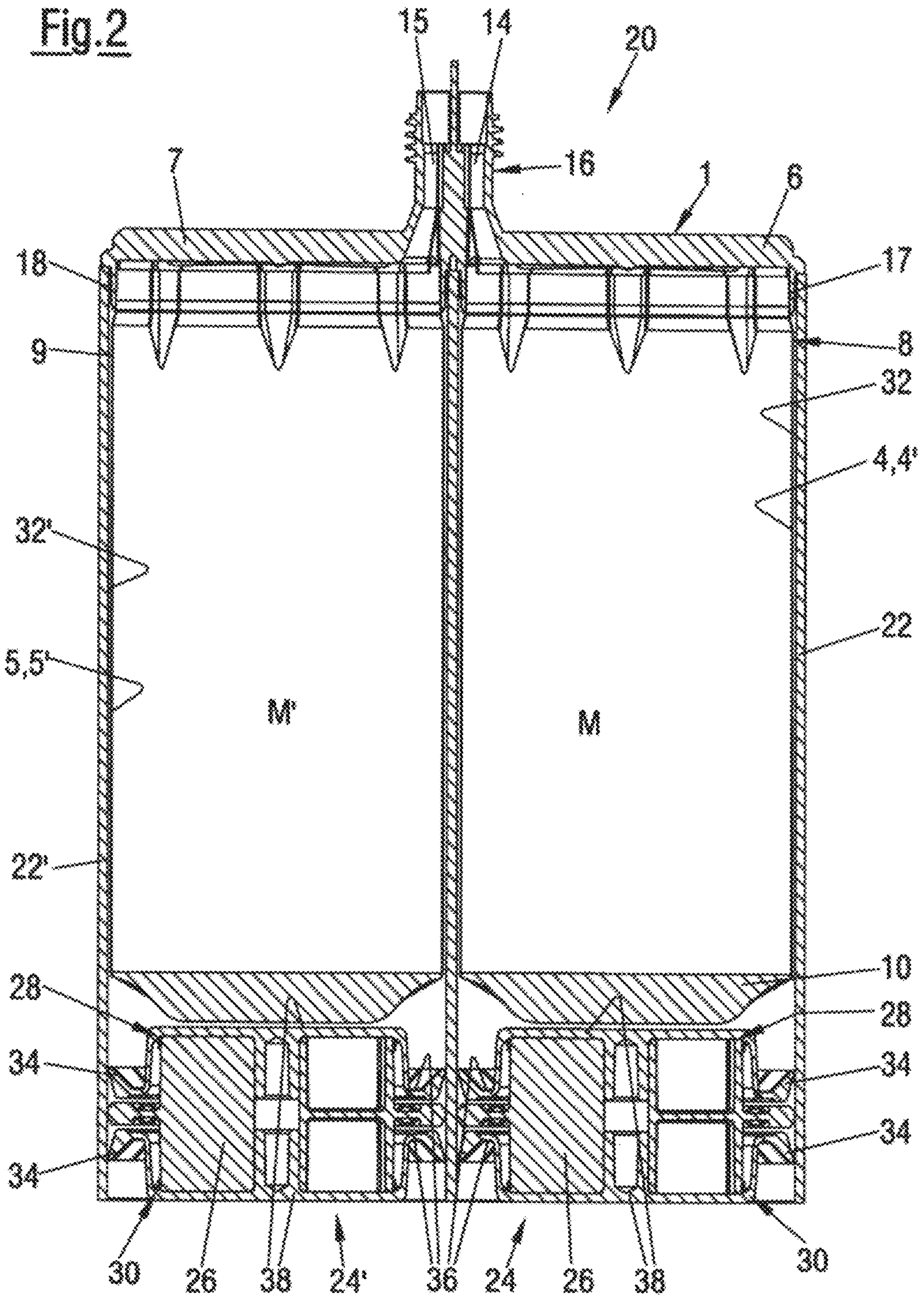
FIG. 2 is a sectional view of a further kind of two-component cartridge installed in a two-component container with a respective piston also being installed within each sleeve of the two-component container.

FIG. 2 shows a sectional view of a second type of cartridge 1 installed in a dispensing assembly 20. The film bag cartridge 1 is configured to discharge two materials M, M', such as a multi-component adhesive comprising a binder and a hardener, i.e. a mastic material M, M'.

The dispensing assembly 20 further comprises two sleeves 22, 22' accommodating a respective one of the cartridge chambers 2, 3 having the cartridge walls 4, 5 formed by the films 4', 5' and a respective piston 24, 24'.

The sleeve 22, 22' is preferably an extruded aluminum sleeve. Alternatively, the sleeve 22, 22' can be formed from an injection molded plastic material.

The respective sleeve 22, 22' is configured to be coupled to the head part 6, 7 of the film bag cartridge 1, with the head parts 6, 7 being integrally formed and comprising the common outlet part 16. The outlet part 16 can be coupled to the mixing element 78 (see FIG. 7) in use. In the storage state the outlet part 16 can be sealed off using a plunger (not shown) which is inserted into the respective outlet passages 14, 15.

The outlet part 16 shown in FIG. 1 is intended to be connected to the mixing element 78 or the plunger via bayonet like connection means, whereas in FIG. 2 the outlet part 16 is intended to be connected to the mixing element 78 respectively the plunger via a cap nut (also not shown).

Each piston 24, 24' has an at least substantially cylindrical outer shape and comprises a piston body 26 as well as first and second film bag retainers 28, 30 arranged at opposite sides of the piston body 26.

Each of the pistons 24, 24' is configured for use with the respective cartridge wall 4, 5 of the film bag cartridge 1, and each of the first and second film bag retainers 28, 30 is configured to interact, in particular directly, with the walls 4, 5 of the film bag cartridge 1.

On moving the respective piston 24, 24' in the sleeve 22, 22' towards the respective head part 6, 7 the material M, M' stored in the cartridge chamber 2, 3 is dispensed via the common outlet part 16. As the material leaves the cartridge chambers 2, 3, part of the rear end 10, 11 of the film 4', 5' forming the cartridge walls 4, 5 becomes loose and has to be collected in order to prevent the film 4', 5' from being caught between the pistons 24, 24' and an inner wall 26, 26'.

If the film 4', 5' is caught between the pistons 24, 24' and an inner wall 26, 26', this could either produce a tear in the film 4', 5' which could either render the cartridge 1 inoperable or at least significantly reduce the lifetime of the materials M, M' stored in the cartridge 1. Alternatively the loose material could be trapped between the piston 24, 24' and the sleeve 22, 22' causing the piston 24, 24' to be jammed in the sleeve 22, 22' preventing the piston 24, 24' from being moved further towards the head part 6, 7. Both of these scenarios are to be avoided if possible.

Figure 3:
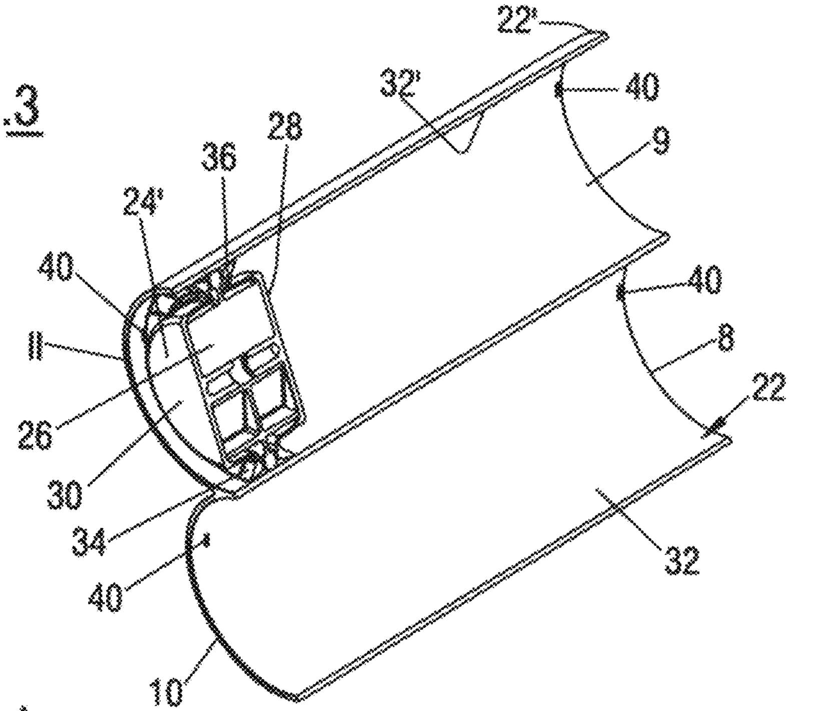
FIG. 3 is a schematic sectional view of two sleeves with one piston being installed in one of the two sleeves.

The function of the first and second film bag retainers 28, 30 is to collect the loose material of the part of the rear end 10, 11 of the film 4', 5' forming the cartridge walls 4, 5, by guiding this from the outside of a collar 34 of the first and second film bag retainers 28, 30 towards a ring recess 36 and then towards a central part 38 of the film bag retainer 28, 30 facing the collar 34. FIG. 3 shows a schematic sectional view of the two sleeves 22, 22' with one piston 24' being installed in one of the two sleeves 22'. The respective sleeve 22, 22' comprises projections 40 arranged at either end of the respective sleeve 22, 22' at the inner surface 32, 32' of the sleeve 22, 22'. Preferably two or more such projections 40 are formed at either end of the respective sleeve 22, 22', with only being shown in the schematic sectional view of FIG. 3.

The projections 40 are provided at the sleeves 22, 22' in order to prevent the piston 24, 24' from falling out of the sleeve 22, 22'. The piston 24, 24' can have some form of introduction aid (not shown) present at an outer surface thereof, via which the piston 24, 24' can be inserted into the sleeve 22, 22' in a controlled manner. The introduction aid can be present as a groove (not shown) through which the projection 40 can be guided on installing the piston 24, 24' in the sleeve 22, 22' of the dispensing assembly 20.

Figure 4:
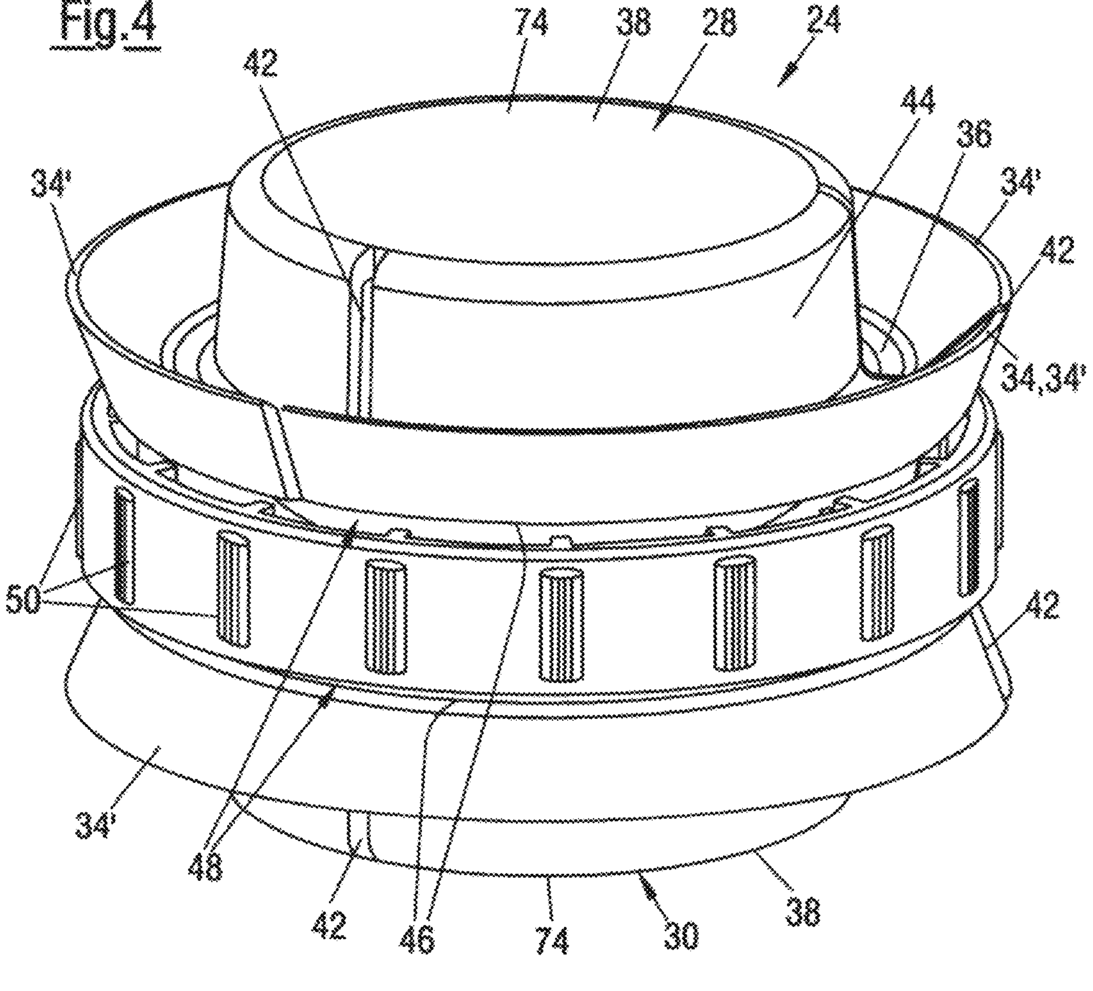
FIG. 4 is a schematic view of a piston.

FIG. 4 shows a schematic view of the piston 24, 24'. Each film bag retainer 28, 30 has the central part 38 surrounded by the ring recess 36 and the collar 34 facing the central part 38.

Three slots 42 extend from a radial outer side of the collar 34 through the ring recess 36 towards the central part 38 of the film bag retainer 28, 30. The slots 42 extend into a sidewall 44 of the central part 38 up to a front face 74 of the respective film bag retainer 28, 30. The slots 42 divide the collar 34 into respective collar sections 34'. It should be noted in this connection that the slots 42 do not have to present at the sidewall 44 or they could also only extend e.g. part of the way of a height of the sidewall, in particular e.g. 30% to 70% of the height of the sidewall 44 transverse to the recess 36.

The plurality of slots 42 separating the plurality of collar sections 34' can have a non-uniform shape, i.e. the slots 42 may not have walls that extend in parallel to one another as shown in FIG. 3, but the walls of the slots 42 can taper apart either in the direction towards the sidewall from the radial outer side or in a direction facing away from the sidewall 44. It is also conceivable that the slots 42 can comprise first and second slot sections (not shown), with a spacing between the first slot sections being smaller than a spacing between the second slot sections.

It should be noted in this connection that it is preferred if the first slot section is smaller than the second slot section, with the first slot section preferably being arranged further towards the outer circumference of the piston 24, 24' than the second slot section.

It should further be noted that the slots 42 and/or the ring recess 36 is/are not specifically limited to their specific shape and form and they can be formed such that they have a polygonal, rectangular, triangular, U-shaped, V-shaped etc. cross-section in the radial direction of the first and second film bag retainers 28, 30 extending transverse to the sidewall 44.

It should further be noted that the number of slots is not specifically limited and can be 3 to 30, typically 3 to 24.

It should further be noted that a thickness of the respective collar section 34' is important. If the thickness is too thin the collar section 34' can be too fragile or breakable, if it is too thick it will not be easily moveable. Thus the typical thicknesses of the collar sections 34' will be on the order of mm's, for example 2 mm or less or 0.8 to 1.5 mm in thickness.

It should further be noted that the geometric form of the respective collar section 34' is not specifically limited, and it can be polygonal, rectangular, pentagonal, square, hexagonal, octagonal, or triangular etc.

The number of collar sections 34' is also not specifically limited and typically can vary from 3 to 30, in particular 3 to 24. The larger the number of collar sections 34' is, the more flexible these are and hence a larger number of collar sections 34' is better for larger diameter pistons 24, 24'. The trade-off is that the dies and injection molding equipment required to produce such a piston 24, 24' are more complicated in comparison to pistons 24, 24' having a smaller number of collar sections 34'.

Each of the respective collar sections 34' is moveable relative to the piston head and the piston body 26 and the central part 28, 30. The collar sections 34' are in particular resilient or flexible and moveable relative to the piston body 26 and the central part 28, 30 without breaking, and are typically embodied to be movable based on a force of inserting these into the sleeve mechanically by hand, although one could potentially use compressed air (e.g. 6.9 bar) for assistance.

On dispensing the material stored in the film bag cartridge 1 pressures in the range of 10 to 50 bar are exerted onto the piston body via a dispenser 76 (see FIG. 7) and to dispense materials stored in the film bag cartridge 1. These pressures are transferred via the piston 24, 24' and the plurality of collar sections 34' to the film bag cartridge 1. The collar sections 34' like the piston 24, 24' have to thus be configured such that they can cope with this transfer of pressures from the dispenser 76 to the film bag cartridge 1.

A base 48 of the ring recess 36 is spaced apart from the piston body 26 by a gap 46. In this connection it should be noted that the gap 46 can have a height selected in the range of 0.7 to 2 mm.

The size of this gap 46 is namely selected to ensure that none of the collar sections 34' is bent over too much and thus eventually breaks away from the piston 24, 24' during the movement of the piston 24, 24' towards the head part 6, 7 on dispensing material from the film bag cartridge 1. In this way the piston body 26 acts as a support for the plurality of collar sections 34' when these are deflected towards the piston body 26 on dispensing materials from the film bag cartridge 1.

Preferably, the piston 24, 24' is an injection molded part injection molded from one or more materials, in particular one of POM, PTFE, PA or a polymer or a thermoset material having a hardness measured with the Shore D Durometer selected in the range of 55D to 100D.

As is well known in the art, a hot injection molded material can shrink during its cooling. However, in order to overcome this drawback, and in particular to retain the size of the plurality of collar sections 34', each collar section 34' can comprise one or more recesses (not shown) on an inner surface thereof facing the sidewall 44. The recesses can also be formed on an outer portion of the collar section 34' facing away from the sidewall 44. It is to be understood, that the outer portion of the collar section can also be formed without a recess.

Furthermore, in order to guide the piston 24, 24' during its movement along a dispensing axis D (see FIG. 7) of the cartridge 1, the piston body 26 can comprise a plurality of guide structures. The guide structures are presently formed as axially aligned ribs 50 protruding from the piston body 26. The ribs 50 could be configured to engage corresponding channels (not shown) present in the sleeve 22, 22'.

Alternatively, the guide structures of the piston 24, 24' can also be formed as channels, if the inner surface 32, 32' of the sleeve 22, 22' comprises corresponding protrusions (also not shown).

In this connection it should be noted that the sleeve 22, 22' can be formed without such guide structures and simply have the inner wall 32, 32' formed without recesses or protrusions as currently shown in FIG. 2.

In this connection it should be noted that also the piston 24, 24' can be formed without such guide structures.

Figure 5:
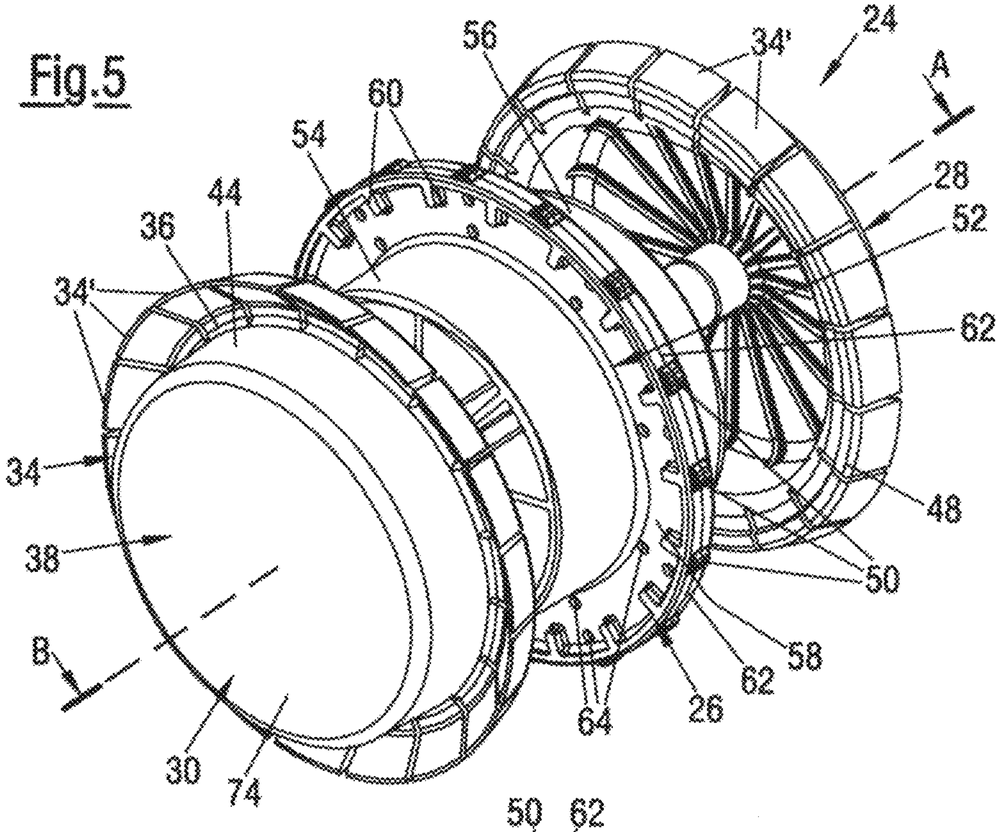
FIG. 5 is an exploded view of a further piston.

FIG. 5 shows an exploded view of a further piston 24, with the first and second retainers 28, 30 being separate from the piston body 26. The piston 24 comprises twenty collar sections 34' in comparison to the piston 24 of FIG. 3.

The piston body 26 has a disc shaped part 52 and first and second projections 54, 56 projecting from the piston body 26 at opposite sides of the body 26 in the direction of the film bag retainers 28, 30.

The disc shaped part 52 of the piston body 26 comprises a base plate 58 and a plurality of webs 60 arranged at either side of the base plate 58. The plurality of webs 60 extend radially inwardly from an outer circumferential wall 62 of the disc shaped part 52 of the piston body 26.

The webs 60 can extend over 20 to 100% of a length of the disc shaped part 52 between the first and second projections 54, 56 and the outer circumferential wall 62. In the present example the webs extend over 40% of the length of the disc shaped part 52.

If provided the plurality of webs 60 can namely strengthen both the piston body 26 and the outer circumferential wall 60 of the piston body 26 such that the piston body 26 is formed less flexible than the collar 34 of the respective first and second retainer 28, 30.

Also visible are a plurality of apertures 64 arranged at the disc shaped part 52 of the piston body 26. The plurality of apertures 64 provide the possibility of enabling an exchange of air at the piston 24 on using the piston 24 in the dispensing assembly 20.

Figure 6:
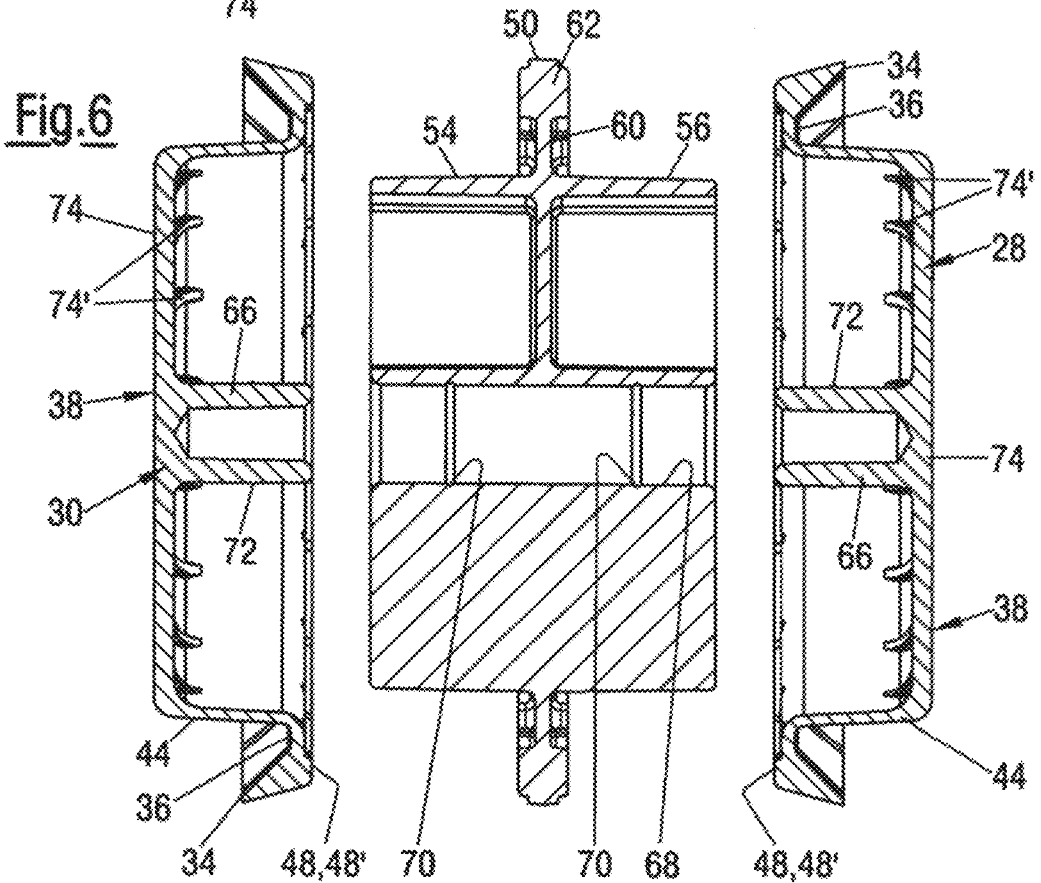
FIG. 6 is a schematic sectional view of the piston of FIG. 5 along the sectional line A: A.

FIG. 6 shows a schematic sectional view of the piston of FIG. 5 along the sectional line A:A. As is visible the first and second projections 54, 56 are ring-shaped projections. Moreover, the first and second film bag retainers 28, 30 comprises a central projection 66 projecting towards the piston body 26. The central projection 66 cooperates with a respective one of the first and second projections 54, 56 by engaging one of the two central apertures 68 of the respective ring shaped projection 54, 56.

In the present example the film bag retainers 28, 30 is received via a snap-fit connection present between central projection 66 and the central aperture 68. The snap-fit connection being formed by an annular groove 70 present at the central aperture 68 cooperating with a circumferential lip 72 present at the central projection 66. In this connection it should be noted that the groove could also be present at the central projection 66 and the circumferential lip could be present at the central aperture 68.

It is also conceivable that each film bag retainer 28, 30 is received via one of a friction fit or a press-fit connection at the piston body 26. It is also conceivable that the piston 24 is made in one piece e.g. in an injection molding process or a 3D printing process and hence that no central projection cooperating with a central aperture is provided.

In this connection it should be noted that a material of the film bag retainer 28, 30 can be different from a material of the piston body 26, or it can be made from the same material as the piston body 26. In any event the collars 34 of the first and second film bag retainers 28, 30 have to be designed such that they are more flexible than a material of the piston body 26 in order to enable a relative movement between the collar 34 and the piston body 26.

The central parts 38 of the film bag retainers 28, 30 comprises the front face 74 remote from the piston body 26, with the front face 74 forming a flat plane or an at least substantially flat plane.

The front face 74 projects by 20% to 75% of a height of the film bag retainer 28, 30 beyond a height of the collar 34, with the height of the film bag retainer 28, 30 being measured between the front face 74 and a base 48' of the film bag retainer 28, 30 remote from the front face 74, said base 48' facing the piston body 26.

The first and second film bag retainers 28, 30 also comprise a plurality of support webs 74' arranged at a side of the central part 38 that is remote from the front face 74, i.e. at the side of the film bag retainer 28, 30 having the central projection 66.

It should be noted in this connection that an outermost diameter of the collar 34 is preferably equal to an outermost diameter of the piston body 26. It should be noted that it is also possible that the outermost diameter of the collar 34 is selected in the range of 95% to 105% of the outermost diameter of the piston body 26.

The piston 24, 24' can have an outermost diameter selected in the range of 1 cm to 30, in particular 1.5 to 15 cm, especially 2 to 10 cm; and/or a height measured between the front faces 74 of the first and second film bag retainers 28, 30 selected in the range of 0.5 to 7 cm in particular 1 to 5 cm.

Figure 7:
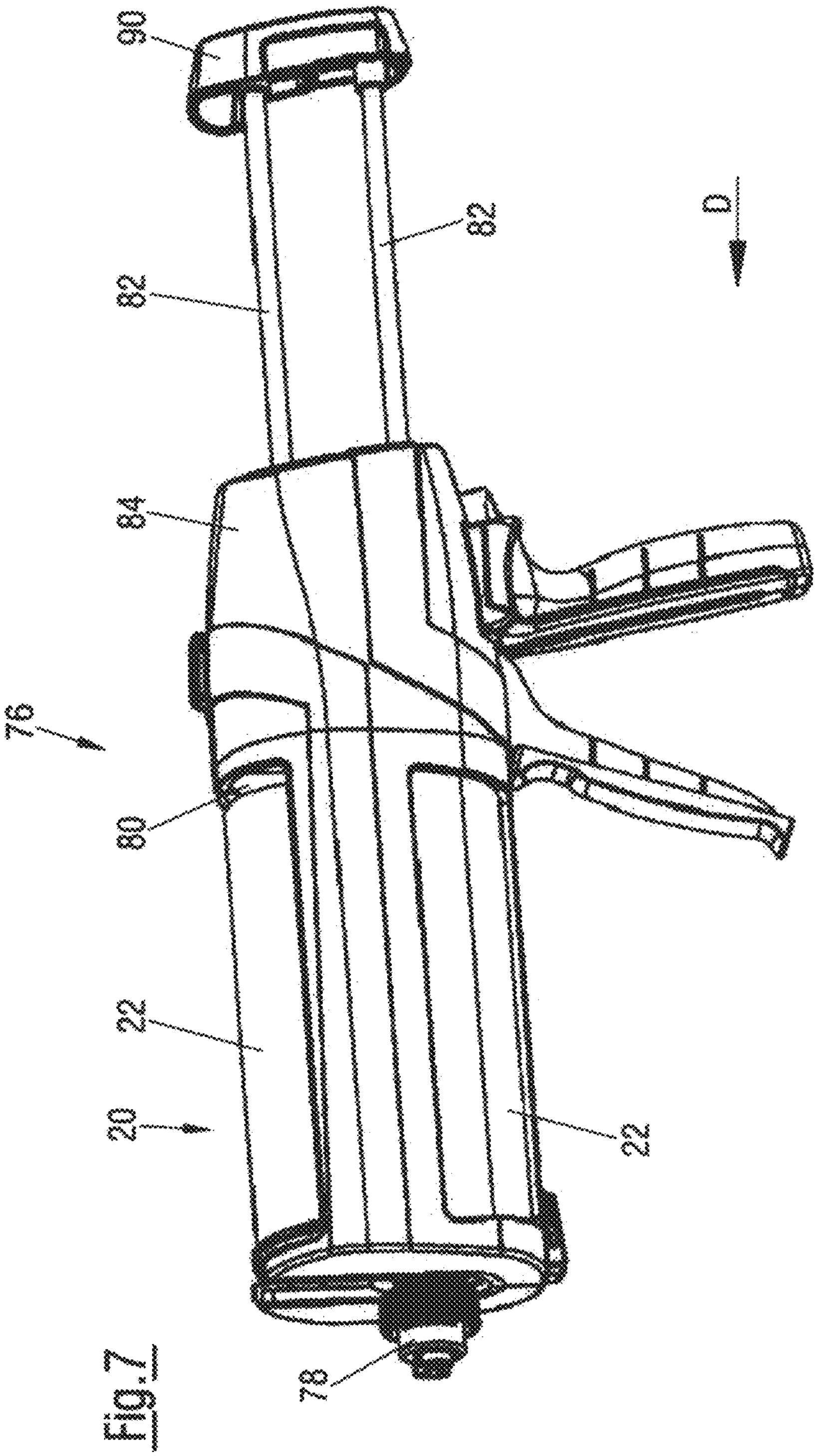
FIG. 7 is a view of a dispenser.

FIG. 7 shows a dispenser 76 in which the dispensing assembly 20 installed in a reception space 80 thereof. The mixing element 78 is connected to the outlet part 16 of the dispensing assembly 20. Only part of the mixing element 78 is visible in the drawing of FIG. 7.

The dispenser comprises two push rods 82, with the push rods 82 being configured to move the respective piston 24, 24' to and fro along the dispensing axis D of the respective push rod 82, wherein said push rods 82 can be coupled to said piston 24, 24' or is fixedly connected to said piston 24, 24'.

As the push rods 82 move the pistons 24, 24' along the dispensing axis D of the reusable film bag cartridge 1, the front face 74 facing away from the piston base 26 pushes against the film bag cartridge 1, thereby urging the material stored inside the film bag cartridge 1 out of the outlet part 16 and through the mixing element 78.

The push rods 82 are moved via a movement mechanism (not shown) arranged within the dispenser body 84 on actuation of the trigger lever 86 relative to the handle 88. In order to stabilize the movement of the push rods 82, the dispenser 76 further comprises an end support 90 arranged at an end of the push rods 82.

The invention claimed is:

1. A piston for a support sleeve of a dispensing assembly comprising a film bag cartridge, the piston comprising:

an at least substantially cylindrical outer shape;

a piston body; and first and second film bag retainers arranged at opposite sides of the piston body, the first and second film bag retainers formed from materials more flexible than a material of the piston body, or the first and second film bag retainers comprising components designed to be more flexible than parts of the piston body.

2. The piston in accordance with claim 1, wherein the piston is configured to be operated with the film bag cartridge and each of the first and second film bag retainers is configured to interact with the film bag cartridge.

3. The piston in accordance with claim 1, wherein the piston body has a disc shaped part and first and second projections projecting from the piston body at opposite sides of the piston body in a direction of the first and second film bag retainers.

4. The piston in accordance with claim 3, wherein the first and second projections are ring-shaped projections, or the disc shaped part comprises ribs at an outer circumferential surface thereof.

5. The piston in accordance with claim 4, wherein each of the first and second film bag retainers comprises a central projection projecting towards the piston body, and the central projection of the first and second film bag retainers cooperates with a central aperture of a respective one of the ring shaped projections.

6. The piston in accordance with claim 3, wherein each of the first and second film bag retainers comprises a central projection projecting towards the piston body.

7. The piston in accordance with claim 6, wherein the central projection of the first and second film bag retainers cooperates with a respective one of the first and second projections.

8. The piston in accordance with claim 1, wherein each of the first and second film bag retainer is received via one of a press-fit, a friction fit or a snap fit connection at the piston body.

9. The piston in accordance with claim 1, wherein each of the first and second film bag retainer has a central part surrounded by a ring recess and a collar facing the central part.

10. The piston in accordance with claim 9, wherein the central part of the film bag retainer comprises a front face remote from the piston body, with the front face forming a flat plane or an at least substantially flat plane, or the front face projects by 20% to 75% of a height of the first and second film bag retainers beyond a height of the collar, with the height of the first and second film bag retainers being measured between the front face and a base of the first and second film bag retainers remote from the front face, the base facing the piston body.

11. The piston in accordance with claim 9, wherein a base of the recess is spaced apart from the piston body by a gap, the gap having a height in a range of 0.7 to 2 mm.

12. A dispensing assembly comprising:

the film bag cartridge;

the support sleeve configured to accommodate the film bag cartridge; and the piston in accordance with claim 1 accommodated in the support sleeve of a respective one of said one or more sleeves.

13. The dispensing assembly in accordance with claim 12, wherein the cartridge is filled with a material.

14. The dispensing assembly in accordance with claim 13, wherein the material is a mastic material.

15. A dispenser comprising:

a push rod configured to move the piston in accordance with claim 1 to and fro along a dispensing axis of the push rod, the push rod configured to be coupled to the piston or fixedly connected to the piston.

16. A piston for a support sleeve of a dispensing assembly comprising a film bag cartridge, the piston comprising:

an at least substantially cylindrical outer shape;

a piston body; and first and second film bag retainers arranged at opposite sides of the piston body, each of the first and second film bag retainer having a central part surrounded by a ring recess and a collar facing the central part, and at least the collar and the ring recess and a sidewall of the central part comprising three or more slots that extend from a radial outer side of the collar towards the central part of the first and second film bag retainer.

17. The piston in accordance with claim 9, wherein a base of the recess is spaced apart from the piston body by a gap.

18. A piston for a support sleeve of a dispensing assembly comprising a film bag cartridge, the piston comprising:

an at least substantially cylindrical outer shape;

a piston body; and first and second film bag retainers arranged at opposite sides of the piston body, each of the first and second film bag retainer having a central part surrounded by a ring recess and a collar facing the central part, and a surface of the collar facing the central part comprises one or more recess or one or more projection.

* * * * *